United States Patent
Baba

(10) Patent No.: US 10,074,990 B2
(45) Date of Patent: Sep. 11, 2018

(54) POWER CONVERSION APPARATUS, POWER MANAGEMENT APPARATUS, AND METHOD FOR POWER MANAGEMENT

(71) Applicant: KYOCERA Corporation, Kyoto-shi, Kyoto (JP)

(72) Inventor: Masahiro Baba, Kawasaki (JP)

(73) Assignee: KYOCERA Corporation, Kyoto (JP)

(*) Notice: Subject to any disclaimer, the term of this patent is extended or adjusted under 35 U.S.C. 154(b) by 182 days.

(21) Appl. No.: 14/907,532

(22) PCT Filed: Jul. 25, 2014

(86) PCT No.: PCT/JP2014/003936
§ 371 (c)(1),
(2) Date: Jan. 25, 2016

(87) PCT Pub. No.: WO2015/011932
PCT Pub. Date: Jan. 29, 2015

(65) Prior Publication Data
US 2016/0164298 A1     Jun. 9, 2016

(30) Foreign Application Priority Data

Jul. 26, 2013 (JP) .................................. 2013-155935

(51) Int. Cl.
H02J 3/38 (2006.01)
H02M 7/44 (2006.01)
(Continued)

(52) U.S. Cl.
CPC ............... *H02J 3/383* (2013.01); *G05F 1/67* (2013.01); *H02J 3/385* (2013.01); *H02J 7/345* (2013.01);
(Continued)

(58) Field of Classification Search
CPC .. H02J 3/383; H02J 3/385; H02J 7/345; H02J 13/0003; H02J 3/007; H02M 3/04;
(Continued)

(56) References Cited

U.S. PATENT DOCUMENTS 7,514,902 B2* 4/2009 Tsuchiya ............ G01R 31/3651
320/130
8,385,842 B2* 2/2013 Yamazaki ......... H04W 52/0277
455/127.1
(Continued)

FOREIGN PATENT DOCUMENTS

JP 2002-56225 A 2/2002
JP 2003-309928 A 10/2003
(Continued)

OTHER PUBLICATIONS

Notification of Reasons for Refusal dated Feb. 28, 2017 issued in counterpart Japanese Application No. 2015-528157.
(Continued)

*Primary Examiner* — Dinh T Le
(74) *Attorney, Agent, or Firm* — Procopio Cory Hargreaves and Savitch LLP

(57) ABSTRACT

Remaining power information regarding remaining power generation capability of a power generation apparatus can be transmitted. A power conversion apparatus includes a controller that acquires remaining power generation capability of a power generation apparatus and a communication interface that transmits remaining power information regarding the remaining power generation capability to an external power management apparatus.

15 Claims, 8 Drawing Sheets

(51) Int. Cl.
*G05F 1/67* (2006.01)
*H02J 13/00* (2006.01)
*H02J 7/34* (2006.01)
*H02J 7/35* (2006.01)
*H02M 3/04* (2006.01)
*H02M 3/156* (2006.01)
*H02J 3/00* (2006.01)

(52) U.S. Cl.
CPC ............ *H02J 7/35* (2013.01); *H02J 13/0003* (2013.01); *H02M 3/04* (2013.01); *H02M 7/44* (2013.01); *H02J 2003/007* (2013.01); *H02M 3/156* (2013.01); *Y02E 10/58* (2013.01); *Y02E 40/72* (2013.01); *Y02P 90/50* (2015.11); *Y04S 10/123* (2013.01)

(58) Field of Classification Search
CPC ......... H02M 3/106; H03M 7/44; Y02P 90/50; Y02E 10/58; Y02E 40/72; Y04S 10/123; G05F 1/07
USPC .................................. 327/306, 333; 307/24
See application file for complete search history.

(56) References Cited

U.S. PATENT DOCUMENTS

| | | | | |
|---|---|---|---|---|
| 8,766,590 B2* | 7/2014 | Lee | ............ | H02J 3/32 320/101 |
| 8,848,404 B2* | 9/2014 | Tan | ............. | H02M 7/515 363/140 |
| 9,013,152 B2 | 4/2015 | Kawamoto et al. | | |
| 9,134,136 B2* | 9/2015 | Yamada | ............ | B60L 11/1861 |
| 9,176,777 B2* | 11/2015 | Hamamoto | .......... | G06F 9/4893 |
| 9,490,632 B2 | 11/2016 | Seon | | |
| 2010/0245101 A1* | 9/2010 | Duan | ............... | H04W 52/0277 340/636.1 |
| 2012/0091967 A1 | 4/2012 | Kawamoto et al. | | |
| 2012/0271470 A1 | 10/2012 | Flynn et al. | | |
| 2013/0134782 A1 | 5/2013 | Seon | | |
| 2014/0236368 A1 | 8/2014 | Iwata | | |
| 2016/0170427 A1* | 6/2016 | Baba | .................... | G06Q 50/06 700/297 |

FOREIGN PATENT DOCUMENTS

| | | |
|---|---|---|
| JP | 2005-086953 A | 3/2005 |
| JP | 2006-214606 A | 8/2006 |
| JP | 2008-42999 A | 2/2008 |
| JP | 2012-016156 A | 1/2012 |
| JP | 2012-85493 A | 4/2012 |
| JP | 2012-100504 A | 5/2012 |
| JP | 2012-182906 A | 9/2012 |
| JP | 2013-114693 A | 6/2013 |
| WO | 2013/046713 A1 | 4/2013 |

OTHER PUBLICATIONS

International Search Report issued by Japan Patent Office for International Application No. PCT/JP2014/003936.
Written Opinion of the International Searching Authority issued by Japan Patent Office for International Application No. PCT/JP2014/003936.
Extended European Search Report dated Mar. 7, 2017, issued by the European Patent Office in counterpart European Patent Application No. 14 82 9018.2.

* cited by examiner (a)

(b)

POWER CONVERSION APPARATUS, POWER MANAGEMENT APPARATUS, AND METHOD FOR POWER MANAGEMENT

CROSS-REFERENCE TO RELATED APPLICATION

This application claims the benefit of International Application No. PCT/JP2014/003936 filed on Jul. 25, 2014, which claims priority to and the benefit of Japanese Patent Application No. 2013-155935 filed Jul. 26, 2013, the entire contents of which are incorporated herein by reference.

TECHNICAL FIELD

This disclosure relates to a power conversion apparatus, a power management apparatus, and a method for power management.

BACKGROUND

In recent years, techniques have become known for using a power management apparatus (for example, a Home Energy Management System (HEMS)) provided for each consumer's facility to control the load established for the consumer's facility, the distributed power source established for the consumer's facility, and the like (see JP 2003-309928 A (PTL 1)).

As the distributed power source, it is thought that a power generation apparatus that generates power from natural energy, such as a photovoltaic power generation apparatus or the like, will be used. The power generation amount during power generation from natural energy can vary for a variety of reasons. In order for the power management apparatus to control other apparatuses, however, it may be necessary to predict the power generation amount. Therefore, it has been proposed to calculate a predicted value of the power generation amount by predicting the solar radiation intensity based on past solar radiation intensity, weather information, and the like and converting the predicted solar radiation intensity into a power generation amount by photovoltaic power generation (see JP 2005-086953 A (PTL 2)).

CITATION LIST

Patent Literature

PTL 1: JP 2003-309928 A
PTL 2: 2005-086953 A

SUMMARY

Technical Problem

A known power conversion apparatus such as a power conditioner, however, does not notify the power management apparatus of remaining power information regarding remaining power generation capability of a power generation apparatus, and the power management apparatus is unable to control operation of load devices based on remaining power information.

It would therefore be helpful to provide a power conversion apparatus, a power management apparatus, and a method for power management that can transmit remaining power information regarding remaining power generation capability of a power generation apparatus.

Solution to Problem

In order to solve the aforementioned problem, a power conversion apparatus according to this disclosure is a power conversion apparatus for converting power of a power generation apparatus and supplying the power to a load of a consumer's facility, the power conversion apparatus including: a controller configured to acquire remaining power generation capability of the power generation apparatus; and a communication interface configured to transmit remaining power information regarding the remaining power generation capability to an external power management apparatus.

In the power conversion apparatus according to this disclosure, the communication interface may transmit the remaining power information periodically.

In the power conversion apparatus according to this disclosure, the communication interface may transmit the remaining power information upon the controller newly acquiring the remaining power information.

In the power conversion apparatus according to this disclosure, the communication interface may transmit the remaining power information using an INFO command in an ECHONET Lite® standard.

In the power conversion apparatus according to this disclosure, the communication interface may transmit the remaining power information as a response upon receiving a request for the remaining power information from the power management apparatus.

In the power conversion apparatus according to this disclosure, the communication interface may receive the request with a GET command in an ECHONET Lite standard.

The power conversion apparatus according to this disclosure may further include a plurality of input interfaces configured to input generated power from each of a plurality of power generation apparatuses of a same type, such that the controller performs MPPT control on a priority basis on at least one input interface among the plurality of input interfaces and acquires a remaining power generation capability of a power generation apparatus connected to another input interface by calculation using a generated current of a power generation apparatus connected to the at least one input interface.

In the power conversion apparatus according to this disclosure, the controller may acquire the remaining power generation capability during independent operation that is disconnected from a power grid.

In the power conversion apparatus according to this disclosure, each of the plurality of power generation apparatuses may be a solar cell string in which a plurality of solar cell modules are connected in series.

In the power conversion apparatus according to this disclosure, all of the plurality of solar cell modules may have equivalent characteristics.

In order to solve the aforementioned problem, a power management apparatus according to this disclosure is a power management apparatus capable of communicating with a power conversion apparatus for converting power of a power generation apparatus, the power management apparatus including: a communication interface configured to receive remaining power information regarding remaining power generation capability of the power generation apparatus from the power conversion apparatus.

In the power management apparatus according to this disclosure, when controlling a load device connected to the power conversion apparatus, the communication interface may request the remaining power information from the power conversion apparatus and receive the remaining power information in response.

In the power management apparatus according to this disclosure, the communication interface may request the remaining power information using a GET command of ECHONET Lite.

In order to solve the aforementioned problem, a method for power management according to this disclosure is a method for power management to communicate information regarding power between a power conversion apparatus for converting power of a power generation apparatus and a power management apparatus for controlling operation of a load device connected to the power conversion apparatus, the method including: the power conversion apparatus acquiring remaining power generation capability of the power generation apparatus; and the power conversion apparatus transmitting remaining power information regarding the remaining power generation capability to the power management apparatus.

Advantageous Effect

According to this disclosure, the power conversion apparatus can transmit the remaining power information related to the remaining power generation capability of the power generation apparatus, and the power management apparatus can control operation of the load device based on the remaining power information.

DETAILED DESCRIPTION

With reference to the drawings, the following describes one of the disclosed embodiments in detail.

Figure 1:
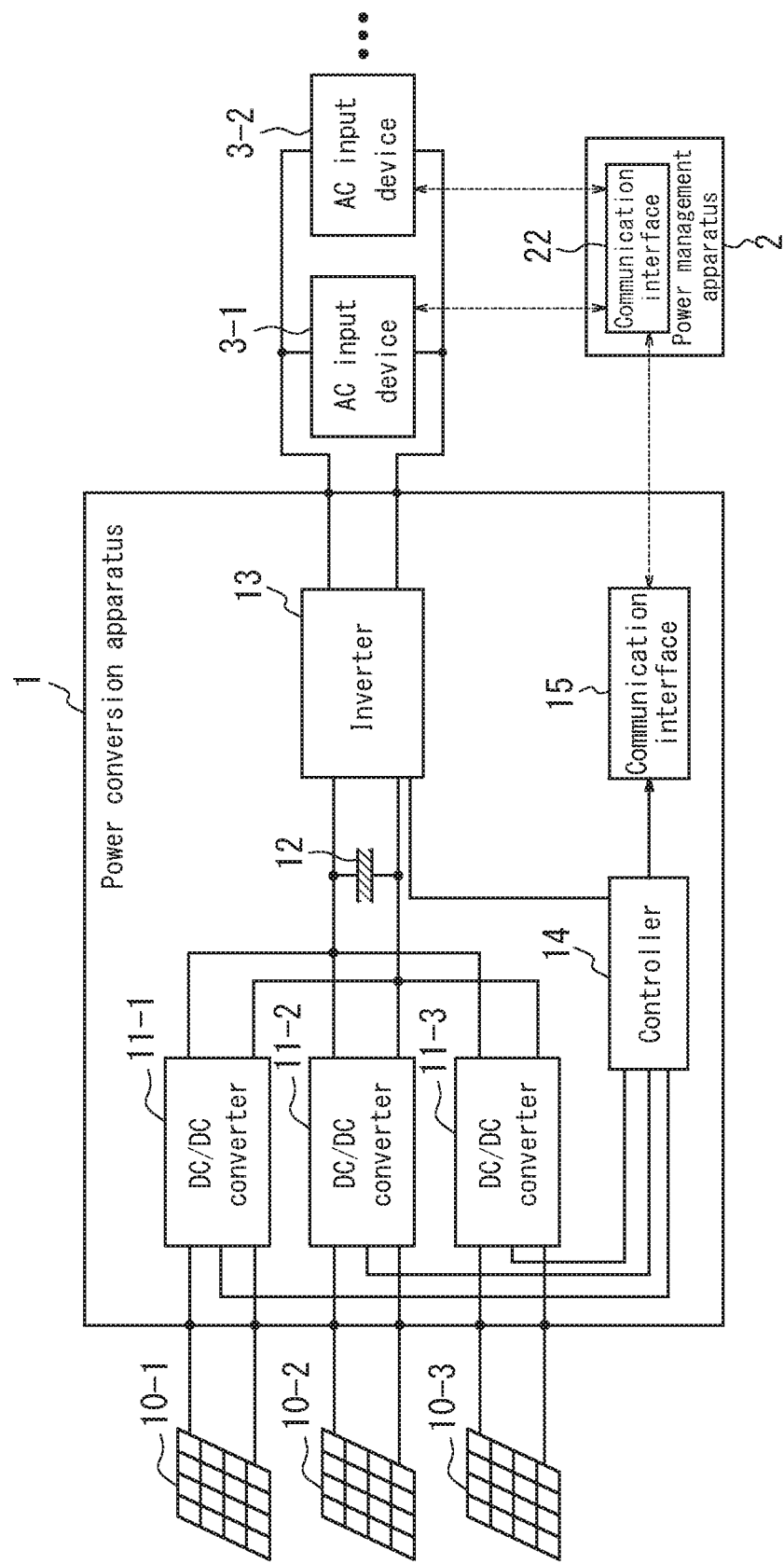
FIG. 1 is a block diagram illustrating an example of the structure of a system including a power conversion apparatus according to one of the disclosed embodiments.

FIG. 1 is a block diagram illustrating an example of the structure of a system including a power conversion apparatus according to one of the disclosed embodiments. As illustrated in FIG. 1, a power conversion apparatus (power conditioner) 1 includes a plurality of DC/DC converters (input interfaces) 11, an intermediate link capacitor 12, an inverter 13, a controller 14, and a communication interface 15. The power conversion system includes a power conversion apparatus 1 and a plurality of power generation apparatuses (DC input power supplies) 10. Although the output of the power conversion apparatus 1 in FIG. 1 is a single-phase two-wire system, the output format is not limited to this system and may, for example, be a three-phase system.

The power conversion apparatus 1 converts the DC power that is input from the connected plurality of power generation apparatuses 10. The power conversion apparatus 1 normally performs interconnected operation by interconnecting with the power grid and performs independent operation by disconnecting from the grid when a power outage occurs in the power grid. The power conversion apparatus 1 thus supplies power to loads of the consumer's facility.

The power generation apparatus 10 outputs DC power. Each of the plurality of power generation apparatuses 10 is a distributed power source, such as a solar cell string, in which a plurality of solar cell modules that convert sunlight to DC power are connected in series; a wind power generator; a fuel cell; or the like. All of the characteristics of the plurality of solar cell modules are preferably the same, for example as a result of each solar cell module being exactly the same.

The DC/DC converter (input interface) 11 raises the voltage input from a plurality of the same type of power generation apparatuses 10 for alignment to a constant voltage. In this embodiment, there are three each of the power generation apparatuses 10 and the DC/DC converters 11, but it suffices for there to be two or more each of the power generation apparatuses 10 and the DC/DC converters 11.

The intermediate link capacitor 12 smooths the DC voltage, which was raised by the DC/DC converter 11, to stabilize the input voltage that is input into the inverter 13. A capacitor for smoothing may be further provided inside each DC/DC converter 11 in order to stabilize the output voltage.

The inverter 13 collectively receives input of the voltage output by the DC/DC converters 11 and converts the DC voltage smoothed by the intermediate link capacitor 12 into AC voltage. The inverter 13 is normally interconnected to the power grid but performs independent operation during a power outage or the like, disconnecting from the power grid and supplying AC power to AC input devices (load devices) 3. FIG. 1 illustrates connection between the power conversion apparatus 1 and AC input devices 3 during independent operation.

The controller 14 controls the output of the DC/DC converters 11 and the inverter 13 by controlling the duty cycle of the switching elements in the DC/DC converters 11 and the inverter 13. During independent operation that is disconnected from the power grid, the controller 14 acquires the remaining power generation capability of the power generation apparatuses 10 by calculation. At this time, the controller 14 performs MPPT control on a priority basis on at least one DC/DC converter 11 and uses the generated current of the power generation apparatus 10 connected to the DC/DC converter 11 to calculate the remaining power generation capability of the power generation apparatuses 10 connected to the other DC/DC converters 11.

The communication interface 15 acquires remaining power information indicating the remaining power generation capability of the power generation apparatuses 10 from the controller 14 and transmits a communication message including the remaining power information to a power management apparatus 2. The communication interface 15 may transmit the remaining power information upon acquiring new remaining power information from the controller 14 or may transmit the remaining power information periodically at predetermined time intervals. Furthermore, the communication interface 15 may, upon receiving a request for remaining power information from the power management apparatus 2, respond by transmitting the remaining power information.

The power management apparatus 2 is a apparatus that controls the operation of load devices connected to the power conversion apparatus 1, and depending on the target of management, may be referred to as a Home Energy Management System (HEMS), Building Energy Management System (BEMS), Factory Energy Management System (FEMS), or Community Energy Management System (CEMS). The power management apparatus 2 includes a communication interface 22 for communicating with the outside.

The communication interface 22 receives the remaining power generation capability information from the communication interface 15 and acquires information on power consumption, such as rating, from the AC input devices 3. Based on these pieces of information, the communication interface 22 controls the AC input devices 3. When controlling the operation of the load devices, the communication interface 22 may request remaining power information from the power conversion apparatus 1 and receive the remaining power information as a response.

Figure 2:
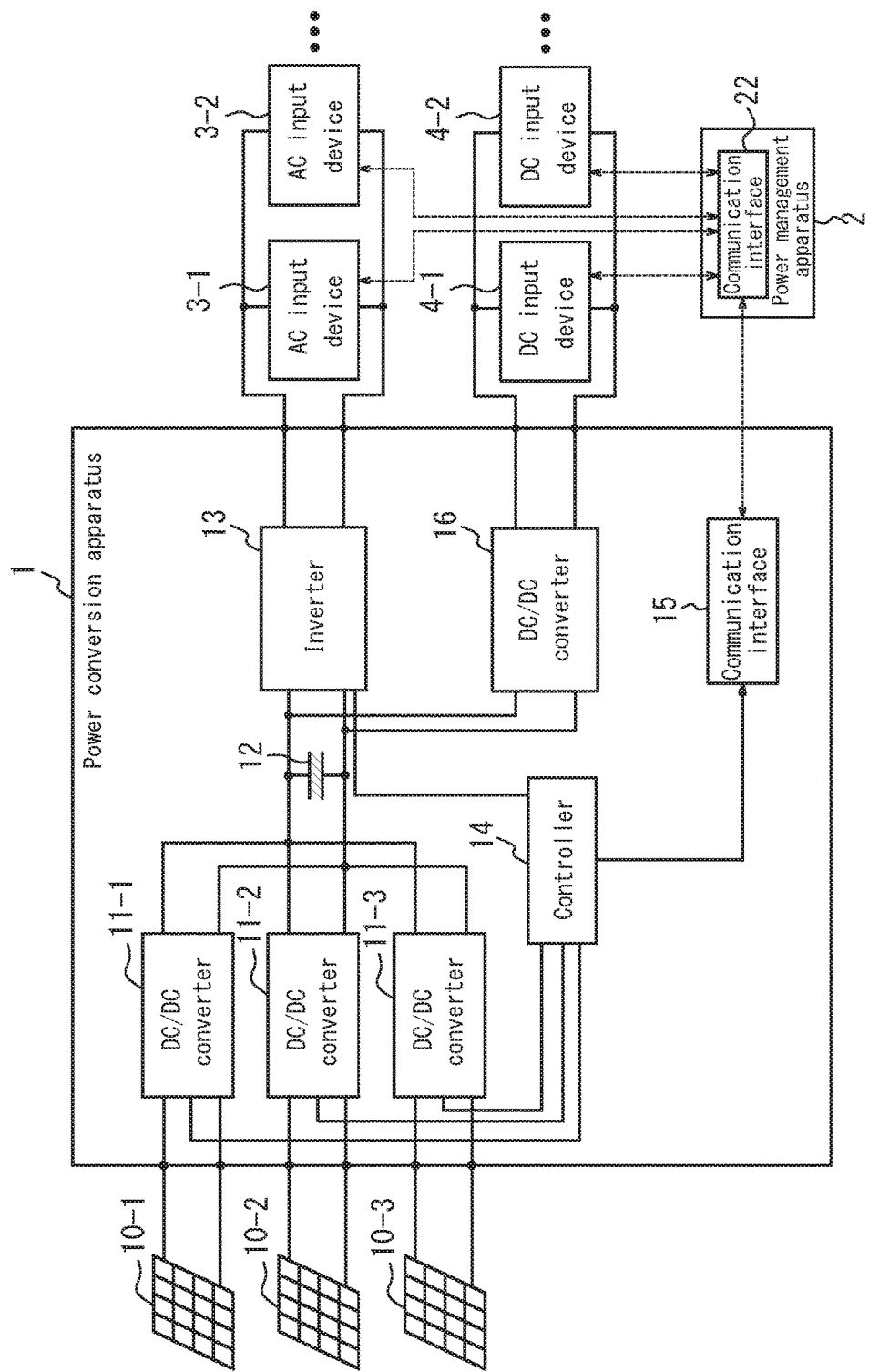
FIG. 2 is a block diagram illustrating another example of the structure of a power conversion apparatus according to one of the disclosed embodiments.

FIG. 2 is a block diagram illustrating another example of the structure of the power conversion apparatus 1. As compared to the power conversion apparatus 1 illustrated in FIG. 1, the power conversion apparatus 1 illustrated in FIG. 2 further includes a DC/DC converter 16 on the output side. The DC/DC converter 16 converts the DC voltage smoothed by the intermediate link capacitor 12 to a predetermined DC voltage and supplies DC power to DC input devices 4 during independent operation. By providing the DC/DC converter 16, DC power can be supplied to the DC input devices 4.

In this way, the power conversion apparatus 1 includes a power converter on the output side. The power converter may be the inverter 13 alone, as illustrated in FIG. 1, or may be the inverter 13 and the DC/DC converter 16 connected in parallel, as illustrated in FIG. 2. Although not illustrated, the power converter may also be the DC/DC converter 16 alone, or may be any number of inverters 13 and DC/DC converters 16 connected in parallel.

Figure 3:
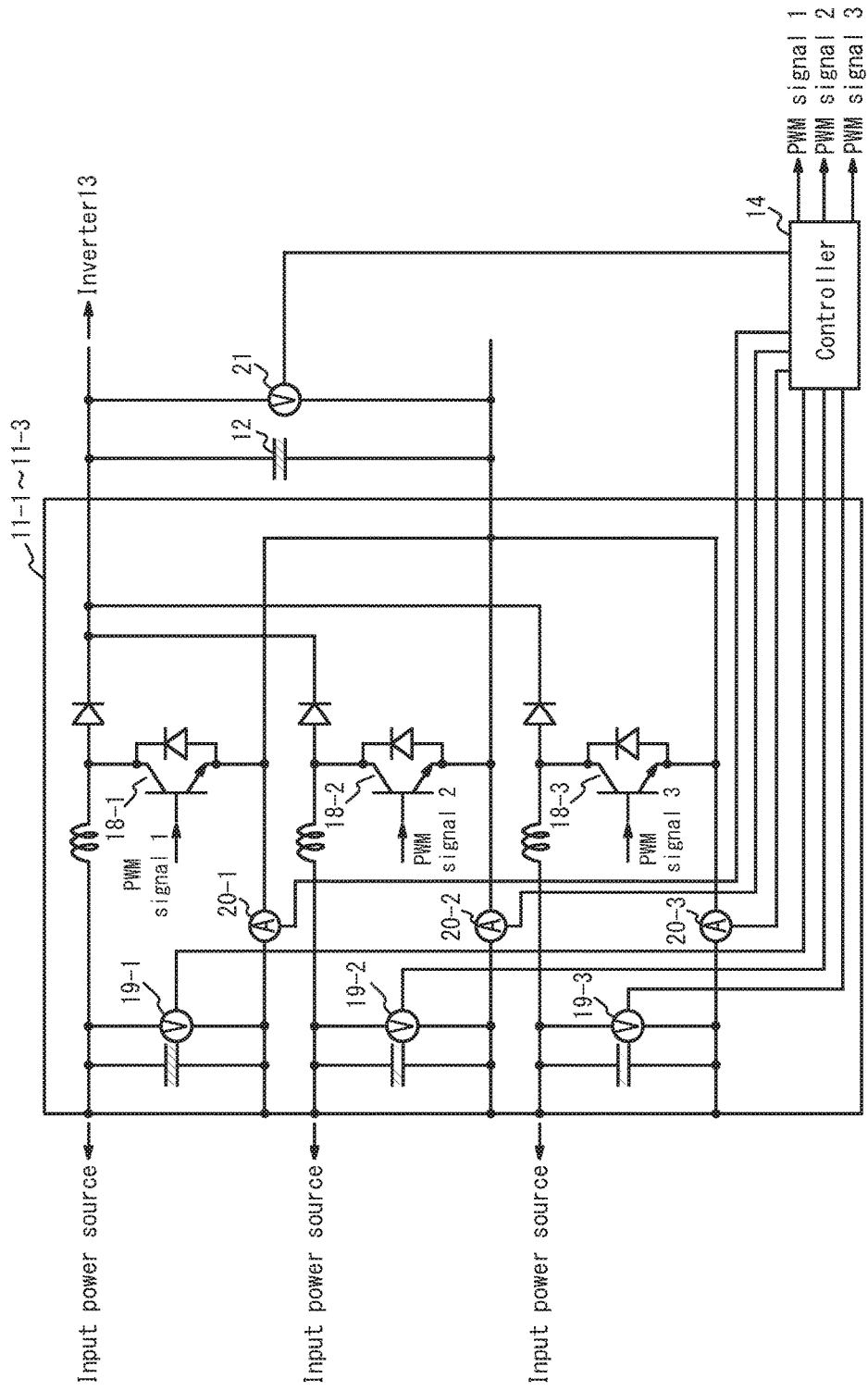
FIG. 3 is a circuit diagram of DC/DC converters in the power conversion apparatus according to one of the disclosed embodiments.

FIG. 3 illustrates an example of a circuit diagram of the DC/DC converters 11 in the power conversion apparatus 1. FIG. 3 also illustrates the controller 14 that performs control on the DC/DC converters 11. FIG. 3 illustrates typical non-isolated boost converters, but the specific circuit structure is not limited to this example. Any structure having a function that can change the impedance as viewed from the input power source and that can control each input power independently to be a desired value may be adopted.

The controller 14 monitors the input voltage of each DC/DC converter 11 detected by input voltage sensors 19 (19-1, 19-2, 19-3), the input current of each DC/DC converter 11 detected by input current sensors 20 (20-1, 20-2, 20-3), and the intermediate link voltage of the inverter 13 detected by an intermediate link voltage sensor 21. Based on these values, the controller 14 generates a PWM signal for the switching element 18 (18-1, 18-2, 18-3) of each of the DC/DC converters 11. Details regarding the control performed on the DC/DC converters 11 are provided below.

Figure 4:
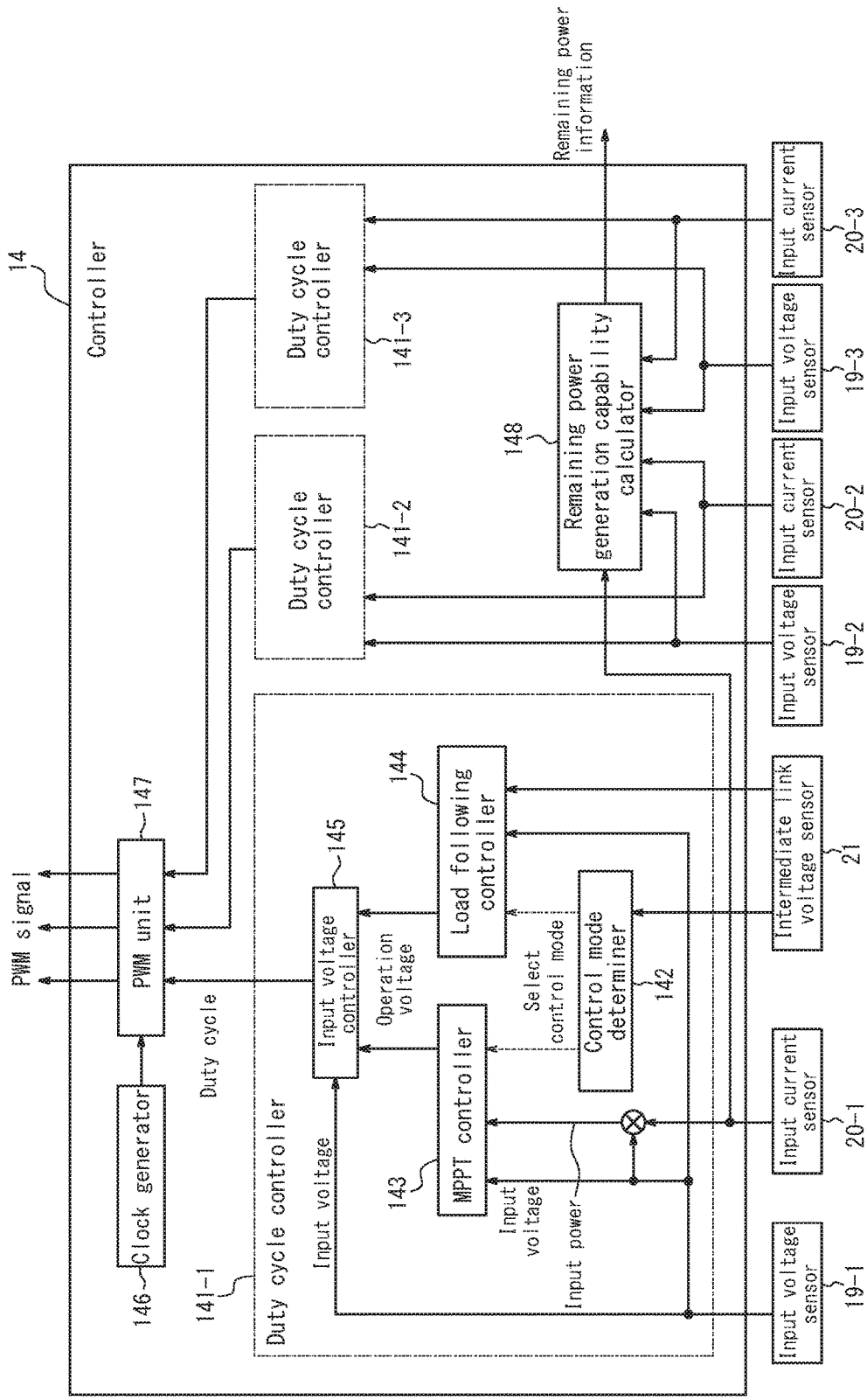
FIG. 4 is a block diagram illustrating the function of a controller in the power conversion apparatus according to one of the disclosed embodiments.

FIG. 4 is a block diagram illustrating the functions of the controller 14 in the power conversion apparatus 1. Operations of the controller 14 are described with reference to FIG. 4.

A duty cycle controller 141-1 controls the duty cycle used to generate the PWM signal for the DC/DC converter 11-1. Similarly, a duty cycle controller 141-2 controls the duty cycle used to generate the PWM signal for the DC/DC converter 11-2, and a duty cycle controller 141-3 controls the duty cycle used to generate the PWM signal for the DC/DC converter 11-3. The duty cycle controllers 141-2 and 141-3 perform the same control as the duty cycle controller 141-1. Moreover, a block diagram of the internal structure of the duty cycle controllers 141-2 and 141-3 is the same as that of the duty cycle controller 141-1 and therefore is not illustrated.

A control mode determiner 142 determines the control mode to be MPPT control during interconnected operation. During MPPT control, the power generation obtained from the power generation apparatus 10 is controlled so as to be maximized.

If MPPT control is performed on all of the DC/DC converters 11 during independent operation, however, the balance between the power consumption of the AC input devices 3 and the power generation of the power generation apparatuses 10 is lost. If load following control is performed on all of the DC/DC converters 11 during independent operation, it becomes difficult for the power generation apparatuses 10 to generate power at maximum power. During load following control, the output voltage of the DC/DC converter 11 is controlled so that the power consumption of the load and the power generation of the input power source become the same. If the power generation apparatus 10 that is trying to follow the power consumption of the load exceeds the maximum power point, the power generation of that power generation apparatus 10 reduces, causing the other power generation apparatuses 10 to exceed the maximum power point by a chain reaction. Ultimately, operation may be suspended due to a lack of power generation.

Therefore, in accordance with the intermediate link voltage detected by the intermediate link voltage sensor 21 during independent operation, the control mode determiner 142 determines the control mode to be either MPPT control or load following control. For example, if the maximum power generation of each power generation apparatus 10 is 200 W, and the power consumption of the AC input devices 3 is 500 W, then the DC/DC converters 11-1 and 11-2 are subjected to MPPT control to obtain a power of 400 W, and the DC/DC converter 11-3 is subjected to load following control to obtain the remaining 100 W of power. In this way, the overall power generation of the power generation apparatuses 10 is made to follow the power consumption of the load.

An MPPT controller 143 monitors the input voltage detected by the input voltage sensor 19 and the input current detected by the input current sensor 20. When the control mode is determined to be MPPT control by the control mode determiner 142, the MPPT controller 143 determines the operation voltage that maximizes the input power to the power conversion apparatus 1. Whereas following is based on input voltage in the example illustrated in FIG. 4, the specific form of MPPT control is not limited to this example.

When the control mode is determined to be load following control by the control mode determiner 142, a load following controller 144 determines the operation voltage that causes the intermediate link voltage detected by the intermediate link voltage sensor 21 to become a target voltage.

An input voltage controller 145 compares the input voltage detected by the input voltage sensor 19 with an operation voltage command value that is determined by the MPPT controller 143 or the load following controller 144 and performs feedback control to change the duty cycle so that the difference becomes equivalent to zero. In the example illustrated in FIG. 4, control is performed so that the operation voltage of the input power source becomes the command value, but it suffices for the controller 14 to perform control to switch between MPPT control and load following control based on the intermediate link voltage. Therefore, control may be performed based on the operation current of the input power source (feedback control based on input current).

A PWM unit 147 generates a PWM signal by comparing a reference waveform, which is synchronized with a clock generated by a clock generator 146, with the duty cycle generated by the input voltage controller 145. The PWM unit 147 then outputs the PWM signal to each DC/DC converter 11.

During independent operation that is disconnected from the power grid, a remaining power generation capability calculator 148 uses the generated current of the power generation apparatus 10 connected to the DC/DC converter 11 on which MPPT control is performed to calculate the remaining power generation capability of the power generation apparatuses 10 connected to the other DC/DC converters 11 and outputs remaining power information indicating the remaining power generation capability to the communication interface 15. Details on the calculation method are provided below.

Figure 5:
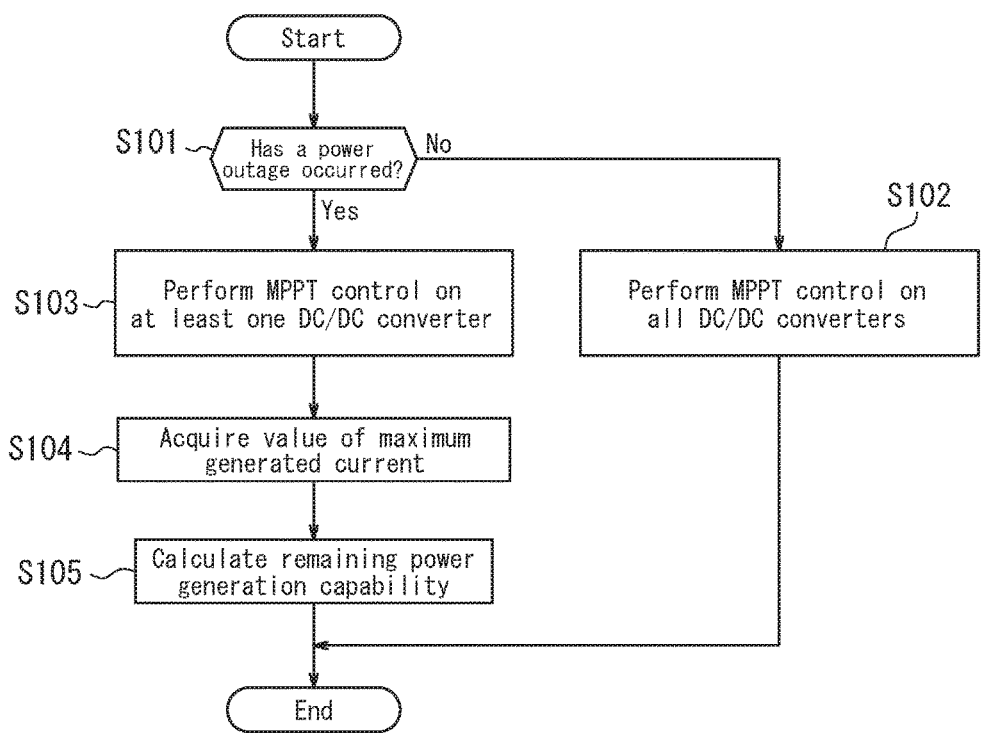
FIG. 5 is a flowchart illustrating operation of the controller in a power conversion apparatus according to one of the disclosed embodiments.

FIG. 5 is a flowchart illustrating operation of the controller 14. When a power outage has not occurred (step S101: No), the controller 14 performs interconnected operation and performs MPPT control on all of the DC/DC converters 11 (step S102).

When a power outage has occurred (step S101: Yes), the controller 14 disconnects from the grid to perform independent operation and performs MPPT control on a priority basis on at least one DC/DC converter 11 (step S103). The reason is described with reference to FIGS. 6 and 7.

Figure 6:
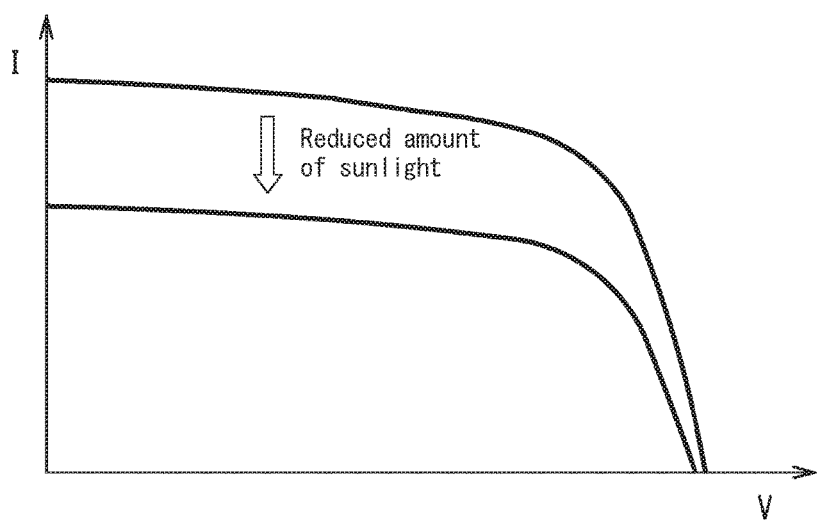
FIG. 6 illustrates the current/voltage characteristics of a power generation apparatus in the power conversion apparatus according to one of the disclosed embodiments.

FIG. 6 illustrates the current/voltage characteristics when the power generation apparatus 10 is a solar cell string. The horizontal axis represents output voltage, and the vertical axis represents output current. The output voltage of the solar cell string is determined by the number of solar cell modules and the temperature and exhibits little change. On the other hand, the output current of the solar cell string varies greatly due to the amount of sunlight. When the amount of sunlight decreases, the output current reduces. In other words, when the amount of sunlight changes, the maximum power generation depends on the generated current.

Figure 7:
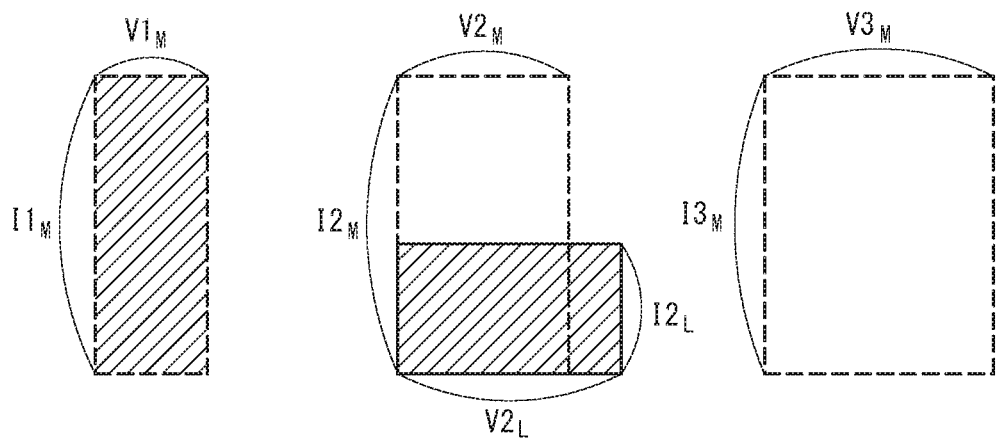
FIG. 7 illustrates power generation of the power generation apparatuses in the power conversion apparatus according to one of the disclosed embodiments.

FIG. 7 schematically illustrates the voltage and current generated by three power generation apparatuses 10-1, 10-2, and 10-3. In this embodiment, the maximum power generation increases in the order of the power generation apparatus 10-1, power generation apparatus 10-2, and power generation apparatus 10-3. The area of the portion enclosed by the dashed line indicates the maximum power generation during interconnected operation (i.e. during MPPT control), and the area of the hatched portion indicates power generation during independent operation.

The generated voltages $V1_M$, $V2_M$, and $V3_M$ of the power generation apparatuses 10 during MPPT control take different values in accordance with the number of solar cell modules in each power generation apparatus 10. On the other hand, the generated currents $I1_M$, $I2_M$, and $I3_M$ of the power generation apparatuses 10 during MPPT control vary in accordance with the amount of sunlight. Assuming that the amount of sunlight is the same for the power generation apparatuses 10, however, the relationship $I1_M = I2_M = I3_M$ can be assumed. Accordingly, by performing MPPT control on a priority basis on at least one DC/DC converter 11 during independent operation (step S103), the controller 14 can learn what the generated current is when MPPT control is performed on the other DC/DC converters 11.

During independent operation, even when the power consumption of the AC input devices 3 is low, it is thought that the power consumption will exceed the maximum power generation of the power generation apparatus 10-1. Therefore, during independent operation, the controller 14 preferably performs MPPT control on a priority basis on the DC/DC converter 11-1 to which the power generation apparatus 10-1 with the smallest maximum power generation is connected. In this way, the value of the maximum generated current can be obtained at an early stage. In the explanation below, MPPT control is assumed to be performed on a priority basis on the DC/DC converter 11-1.

For example, when the maximum power generation of the power generation apparatus 10-1 is 100 W, the maximum power generation of the power generation apparatus 10-2 is 200 W, the maximum power generation of the power generation apparatus 10-3 is 300 W, and the power consumption of the AC input devices 3 is 200 W, then the controller 14 performs MPPT control on the DC/DC converter 11-1 and obtains 100 W from the power generation apparatus 10-1. For the remaining 100 W, the controller 14 may perform control to subject the DC/DC converters 11-2 and 11-3 to load following control so that the total power obtained from the power generation apparatus 10-2 and the power generation apparatus 10-3 is 100 W, or the controller 14 may perform control to subject only one of the DC/DC converters 11-2 and 11-3 to load following control so as to obtain 100 W from only one of the power generation apparatuses 10-2 and 10-3.

Next, the remaining power generation capability calculator 148 obtains the value of the generated current $I1_M$ of the power generation apparatus 10-1 from the input current sensor 20-1 (step S104). Using the generated current $I1_M$ of the power generation apparatus 10-1, the remaining power generation capability calculator 148 then calculates the remaining power generation capability of the remaining power generation apparatuses 10-2 and 10-3 as the difference between the maximum power generation and the present power generation (step S105).

The remaining power generation capability calculator 148 stores the values of the generated voltage $V2_M$ and $V3_M$ of the power generation apparatuses 10-2 and 10-3 during interconnected operation (i.e. during MPPT control) and calculates the maximum power generation $P2_M$ of the power generation apparatus 10-2 as $I1_M \times V2_M$ and the maximum power generation $P3_M$ of the power generation apparatus 10-3 as $I1_M \times V3_M$. For example, when the DC/DC converter 11-2 is subjected to load following control as illustrated in FIG. 6, the remaining power generation capability calculator 148 calculates the remaining power generation capability of the power generation apparatus 10-2 as $P2_M - (I2_L \times V2_L)$. The remaining power generation capability calculator 148 acquires the current $I2_L$ from the input current sensor 20-2 and acquires the voltage $V2_L$ from the input voltage sensor 19-2. Using the generated current $I1_M$ of the power generation apparatus 10-1, the remaining power generation capability calculator 148 thus calculates the remaining power generation capability of the other power generation apparatuses 10-2 and 10-3.

Thus far, the case of considering the amount of sunlight to be the same between the power generation apparatuses 10 has been described. The amount of sunlight may differ between power generation apparatuses 10, however, such as in the case of installing the power generation apparatuses 10 to face different directions on a hip roof.

Figure 8:
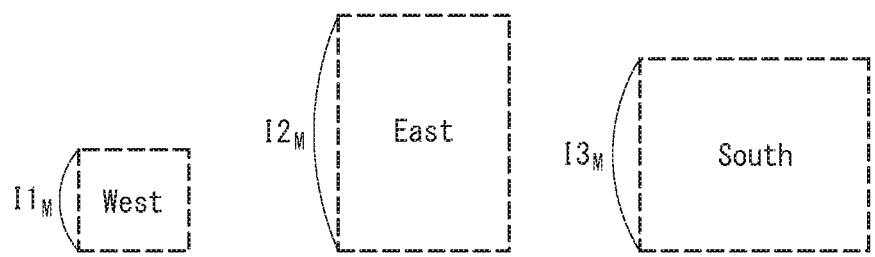
FIGS. 8A and 8B illustrate power generation of the power generation apparatuses in the power conversion apparatus according to one of the disclosed embodiments when the amount of sunlight differs.
Figure 8:

FIGS. 8A and 8B illustrate the power generation amount when the amount of sunlight differs between the power generation apparatuses 10. When the power generation apparatus 10-1 is installed on the west side of the roof, the power generation apparatus 10-2 is installed on the east side of the roof, and the power generation apparatus 10-3 is installed on the south side of the roof, the values of the respective generated currents $I1_M$, $I2_M$, and $I3_M$ differ during interconnected operation. The values of the generated currents $I1_M$, $I2_M$, and $I3_M$ also vary in accordance with the amount of sunlight. FIG. 8A illustrates the maximum power generation in the case of a large amount of sunlight at 10 AM, whereas FIG. 8B illustrates the maximum power generation in the case of a small amount of sunlight at 10 AM.

The difference in the amount of sunlight is determined by the direction of the sun. Therefore, when the amount of sunlight on each power generation apparatus 10 differs, the remaining power generation capability calculator 148 stores the ratio of the maximum power generation or generated current of each power generation apparatus 10 during interconnected operation along with time information.

During interconnected operation (during MPPT control), the remaining power generation capability calculator 148 stores the ratio of the maximum power generation $P1_M$, $P2_M$, and $P3_M$ of the power generation apparatuses 10 or the ratio of the maximum generated current $I1_M$, $I2_M$, and $I3_M$ of the power generation apparatuses 10. During independent operation, the remaining power generation capability is calculated based on the stored maximum power generation ratio or maximum generated current ratio.

When calculating the remaining power generation capability based on the maximum power generation ratio, then based on the value of the generated current $I1_M$ of the power generation apparatus 10-1 acquired from the input current sensor 20-1 and the value of the generated voltage $V1_M$ acquired from the input voltage sensor 19-1, the remaining power generation capability calculator 148 calculates the maximum power generation $P1_M$ as $I1_M \times V1_M$ and calculates the maximum power generation $P2_M$ and $P3_M$ based on the maximum power generation ratio.

When calculating the remaining power generation capability based on the maximum generated current ratio, the remaining power generation capability calculator 148 acquires the value of the generated current $I1_M$ of the power generation apparatus 10-1 from the input current sensor 20-1, calculates the maximum generated currents $I2_M$ and $I3_M$ based on the maximum generated current ratio, calculates the maximum power generation $P2_M$ as $I1_M \times V2_M$, and calculates the maximum power generation $P3_M$ as $I1_M \times V3_M$. Once the maximum power generation is known, the difference from the actual power generation is calculated as the remaining power generation capability.

Figure 9:
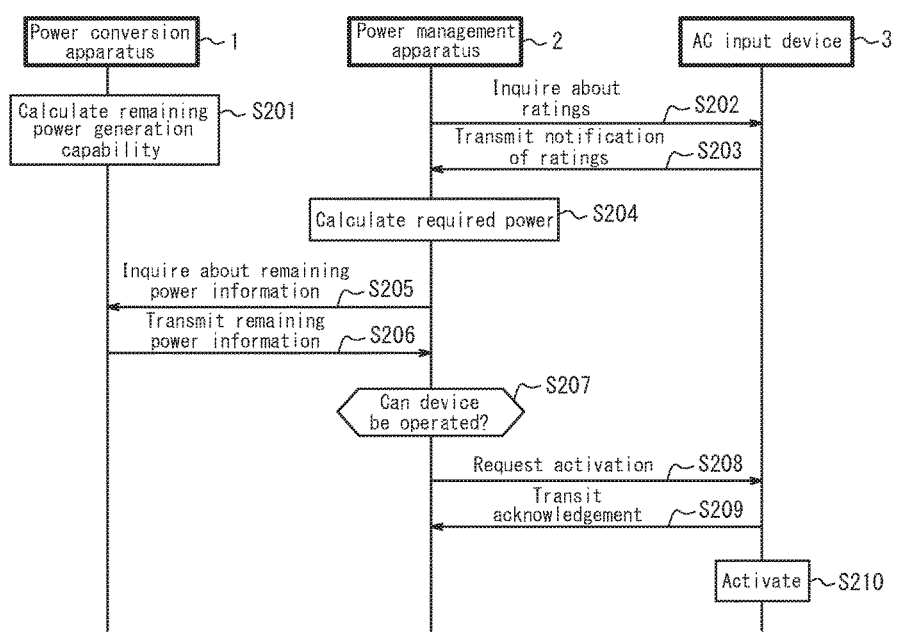
FIG. 9 is a sequence diagram illustrating operation of a system including a power conversion apparatus according to one of the disclosed embodiments.

FIG. 9 is a sequence diagram illustrating operations of the power conversion apparatus 1, power management apparatus 2, and AC input device 3 during independent operation, illustrating the sequence starting with calculation of remaining power generation capability by the power conversion apparatus 1. With the above-described method, the controller 14 of the power conversion apparatus 1 calculates the remaining power generation capability at any time during independent operation (step S201).

The communication interface 22 of the power management apparatus 2 transmits a message, to the AC input device 3 that is a load device to be activated, inquiring about ratings such as the working current or the working voltage (step S202). The AC input device 3 responds to the inquiry about ratings by notifying the power management apparatus 2 of the ratings (step S203).

Upon acquiring the ratings of the AC input device 3, the power management apparatus 2 calculates the power necessary for operation of the AC input device 3 (step S204).

Next, the communication interface 22 of the power management apparatus 2 transmits a message to the power conversion apparatus 1 inquiring about the remaining power generation capability (step S205). The communication interface 15 of the power conversion apparatus 1 responds to the inquiry about the remaining power generation capability and transmits the remaining power information regarding the remaining power generation capability calculated in step S201 to the power management apparatus 2 (step S206).

In this way, a method for power management to communicate information regarding power between the power conversion apparatus 1 for converting power of the power generation apparatus 10 and the power management apparatus 2 for controlling operation of the load device 3 connected to the power conversion apparatus 1 includes the steps of the power conversion apparatus 1 acquiring remaining power generation capability of the power generation apparatus 10 and the power conversion apparatus 1 transmitting remaining power information regarding the remaining power generation capability to the power management apparatus 2.

The communication between the power conversion apparatus 1 and the power management apparatus 2 may use the communication protocol of a variety of standards, such as ECHONET Lite®, Smart Energy Profile of ZigBee®, KNX®, or the like. For example, when using ECHONET Lite as the communication protocol, the communication interface 22 of the power management apparatus 2 requests the remaining power information using the GET command prescribed by the ECHONET Lite standard, thus making it easier to guarantee versatility between devices conforming to the standard (step S205).

Based on the power necessary for operation of the AC input device 3 calculated in step S204 and the remaining power information acquired in step S206, the power management apparatus 2 determines whether the AC input device 3 can be operated (step S207). FIG. 9 illustrates the case of the power management apparatus 2 determining that the AC input device 3 can be operated. An activation request is thus transmitted to the AC input device 3 (step S208). The AC input device 3 then returns an acknowledgment to the power management apparatus 2 (step S209) and activates (step S210). When determining that the AC input device 3 cannot be operated, for example the power management apparatus 2 notifies the user that the AC input device 3 cannot be activated due to insufficient remaining power generation capability.

The communication interface 15 may periodically, or each time new remaining power information is acquired from the controller 14, transmit the remaining power information regarding the remaining power generation capability calculated in step S201 to the power management apparatus 2. In this case, the inquiry by the power management apparatus 2 about remaining power information (step S205) is unnecessary. When using ECHONET Lite as the communication protocol, the communication interface 15 transmits the remaining power information using the INFO command prescribed by ECHONET Lite, thus making it easier to guarantee versatility between devices conforming to the standard.

In this way, the power conversion apparatus 1 according to this disclosure acquires the remaining power generation capability of the power generation apparatus 10 using the controller 14 and transmits remaining power information regarding the remaining power generation capability to the external power management apparatus 2 using the communication interface 15. Hence, the power management apparatus 2 can control operation of the load device based on the remaining power information.

The above embodiments have been described as representative examples, but it is to be noted that many modifications and substitutions within the scope and spirit of this disclosure will be apparent to a person of ordinary skill in the art. Accordingly, this disclosure should not be considered to be limited by the above-described embodiments but rather may be modified or altered in a variety of ways without deviating from the scope of the patent claims. For example, even when using a plurality of wind power generators as power generation apparatuses, the power conversion apparatus may cause at least one wind power generator to operate by MPPT control so as to acquire and provide notification of the remaining power generation capability of the other wind power generators.

REFERENCE SIGNS LIST

1 Power conversion apparatus
2 Power management apparatus
3 AC input device
4 DC input devices
10 Power generation apparatus
11 DC/DC converter
12 Intermediate link capacitor
13 Inverter
14 Controller
15 Communication interface
16 DC/DC converter
18 Switching element
19 Input voltage sensor
20 Input current sensor
21 Intermediate link voltage sensor
22 Communication interface
141 Duty cycle controller
142 Control mode determiner
143 MPPT controller
144 Load following controller
145 Input voltage controller
146 Clock generator
147 PWM unit
148 Remaining power generation capability calculator

The invention claimed is:

1. A power conversion apparatus for converting power from a power generation apparatus and supplying the power to a load of a consumer's facility, the power conversion apparatus comprising:

a plurality of input interfaces configured to input generated power from each of a plurality of power generation apparatuses of a same type;

a controller configured to calculate remaining power generation capability of a first power generation apparatus connected to another input interface by calculation using a generated current of a second power generation apparatus connected to at least one of the plurality of input interfaces; and a communication interface configured to transmit remaining power information regarding the remaining power generation capability to an external power management apparatus.

2. The power conversion apparatus of claim 1, wherein the communication interface transmits the remaining power information periodically.

3. The power conversion apparatus of claim 1, wherein the communication interface transmits the remaining power information upon the controller newly acquiring the remaining power information.

4. The power conversion apparatus of claim 2, wherein the communication interface transmits the remaining power information using an INFO command in an ECHONET Lite standard.

5. The power conversion apparatus of claim 1, wherein the communication interface transmits the remaining power information as a response upon receiving a request for the remaining power information from the power management apparatus.

6. The power conversion apparatus of claim 5, wherein the communication interface receives the request with a GET command in an ECHONET Lite standard.

7. The power conversion apparatus of claim 1, wherein the controller performs MPPT control on a priority basis on the at least one input interface before calculating the remaining power generation capability.

8. The power conversion apparatus of claim 1, wherein the controller acquires the remaining power generation capability during independent operation that is disconnected from a power grid.

9. The power conversion apparatus of claim 7, wherein each of the plurality of power generation apparatuses is a solar cell string in which a plurality of solar cell modules are connected in series.

10. The power conversion apparatus of claim 9, wherein all of the plurality of solar cell modules have equivalent characteristics.

11. The power conversion apparatus of claim 1, wherein the first and the second power generation apparatus are configured to generate power from natural energy.

12. A power management apparatus capable of communicating with a power conversion apparatus for converting power of a power generation apparatus, wherein the power conversion apparatus comprises a plurality of input interfaces configured to input generated power from each of a plurality of power generation apparatuses of a same type, and a controller configured to calculate remaining power generation capability of a first power generation apparatus connected to another input interface by calculation using a generated current of a second power generation apparatus connected to at least one of the plurality of input interfaces, the power management apparatus comprising:

a communication interface configured to receive remaining power information regarding the remaining power generation capability of the first power generation apparatus from the power conversion apparatus.

13. The power management apparatus of claim 12, wherein when controlling a load device connected to the power conversion apparatus, the communication interface requests the remaining power information from the power conversion apparatus and receives the remaining power information in response.

14. The power management apparatus of claim 12, wherein the communication interface requests the remaining power information using a GET command of ECHONET Lite.

15. A method for power management to communicate information regarding power between a power conversion apparatus for converting power of a power generation apparatus and a power management apparatus for controlling operation of a load device connected to the power conversion apparatus, wherein the power conversion apparatus comprises a plurality of input interfaces configured to input generated power from each of a plurality of power generation apparatuses of a same type, the method comprising:

the power conversion apparatus calculating remaining power generation capability of a first power generation apparatus connected to another input interface by calculation using a generated current of a second power generation apparatus connected to at least one of the plurality of input interfaces; and the power conversion apparatus transmitting remaining power information regarding the remaining power generation capability to the power management apparatus.

* * * * *